United States Patent
Anderson et al.

(10) Patent No.: US 8,843,431 B2
(45) Date of Patent: Sep. 23, 2014

(54) SOCIAL NETWORK ANALYSIS FOR CHURN PREDICTION

(75) Inventors: Gary F. Anderson, Praha (CZ); Mark S. Ramsey, Kihei, HI (US); David A. Selby, Hants (GB)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 13/350,865

(22) Filed: Jan. 16, 2012

(65) Prior Publication Data

US 2013/0185245 A1    Jul. 18, 2013

(51) Int. Cl.
*G06F 1/16* (2006.01)
(52) U.S. Cl.
USPC .......................................................... 706/52
(58) Field of Classification Search
USPC ................................................ 706/52; 705/1
See application file for complete search history.

(56) References Cited

U.S. PATENT DOCUMENTS

| | | | |
|---|---|---|---|
| 5,822,410 A | 10/1998 | McCausland et al. | |
| 6,049,599 A | 4/2000 | McCausland et al. | |
| 6,839,680 B1 | 1/2005 | Liu et al. | |
| 7,764,701 B1 | 7/2010 | Issa et al. | |
| 7,813,951 B2 | 10/2010 | Eskandari | |
| 7,813,952 B2 | 10/2010 | Eskandari | |
| 7,827,183 B2 | 11/2010 | Fraser et al. | |
| 2003/0200135 A1 | 10/2003 | Wright | |
| 2009/0192809 A1* | 7/2009 | Chakraborty et al. | ............ 705/1 |

FOREIGN PATENT DOCUMENTS

| | | |
|---|---|---|
| EP | 2 107 761 A1 | 10/2009 |
| WO | 2010048980 | 5/2010 |
| WO | 20101082885 | 7/2010 |

* cited by examiner

*Primary Examiner* — Jeffrey A Gaffin
*Assistant Examiner* — Ola Olude Afolabi
(74) *Attorney, Agent, or Firm* — Whitham, Curtis, Christofferson & Cook, P.C; John R. Pivnichny (57) ABSTRACT

Traditional methods of prediction of the likelihood of churning in a given market such as wireless telecommunications are improved by inclusion of social network analysis to predict churning by members of a population in response to churning by any given individual member of that population. A sphere of influence of individual members of the population on other members of the population are modeled and analyzed through a plurality of degrees of separation and quantitatively evaluated by a number of relational algebraic joins in which at least one such join includes weights to assert a diminishing influence with number of degrees of separation.

20 Claims, 3 Drawing Sheets

| CUSTOMER_A | CUSTOMER_B | NO_CALLS |
|---|---|---|
| 1 | 2 | 20 |
| 1 | 3 | 10 |
| 1 | 4 | 6 |
| 2 | 4 | 3 |
| 4 | 3 | 6 |

Figure 3B

JOIN 1

| CALLERT1 | CALLEDT1 | TOTAL_T1 | CALLERT2 | CALLEDT2 | TOTAL_T2 |
|---|---|---|---|---|---|
| 1 | 2 | 20 | 2 | 4 | 3 |
| 1 | 3 | 10 |   |   |   |
| 1 | 4 | 6  | 4 | 3 | 6 |
| 2 | 4 | 3  | 4 | 3 | 6 |
| 4 | 3 | 6  |   |   |   |

Figure 3C

JOIN 2

| CALLERT1 | CALLEDT1 | CALLERT2 | CALLEDT2 | TOTAL_T1 | TOTAL_T2 | CALLERT3 | CALLEDT3 | TOTAL_T3 |
|---|---|---|---|---|---|---|---|---|
| 1 | 2 | 2 | 4 | 20 | 3 | 4 | 3 | 6 |
| 1 | 3 |   |   | 10 |   |   |   |   |
| 1 | 4 | 4 | 3 | 6  | 6 |   |   |   |
| 2 | 4 | 4 | 3 | 3  | 6 |   |   |   |
| 4 | 3 |   |   | 6  |   |   |   |   |

Figure 3D

JOIN 3 & WEIGHTING

| CALLERT1 | WEIGHT |
|---|---|
| 1 | 39.3 |
| 2 | 4.8 |
| 4 | 6.0 |

SOCIAL NETWORK ANALYSIS FOR CHURN PREDICTION

FIELD OF THE INVENTION

The present invention generally relates to so-called churn prediction and, more particularly, to identification of persons or groups who are likely to alter purchasing patterns, particularly in regard to services such as telecommunication provider services.

BACKGROUND OF THE INVENTION

Maintenance of a flow of revenue is of great importance to many aspects of virtually any on-going business, particularly since consumer demand for goods and/or services must be anticipated in order for the demand to be met. For example, in regard to goods, production and delivery of goods must be sufficient to meet consumer demand as that demand occurs to avoid customers needing to purchase alternative goods to those usually purchased. If alternative goods are purchased, different customer loyalties may develop and market share may be temporarily or permanently lost. Conversely, many markedly superior products, sometimes from relatively obscure producers, have never enjoyed a significant market share because they are seldom available from convenient sources when needed. Ultimately, the value of trademarks may depend, in significant degree, on the ability of consumers to purchase a given product when the product is needed.

In regard to services, both infrastructure and human resources must be sufficient to satisfy peak anticipated demand even though infrastructure often requires very substantial capital expense while the cost of establishing excess capacity cannot generally be recovered or the excess capacity turned to productive use. (The same is true for production capacity for goods although excess production capacity can often be used for production of other products.) Maintaining adequate and perhaps, from time-to-time, excess and underutilized staffing can represent a large ongoing but non-productive cost of operation and management costs to closely match staffing to actual demand may be substantial and carry substantial risk while such management is often deleterious to the reputation of the business. Therefore, accurate prediction of the volume of services that are needed and can be sold is of paramount importance in avoiding unproductive costs that can easily undetermine the profitability of any service provider.

In the real-world marketplace, there will necessarily be a degree of customers switching between alternative products or service providers for products or services that are needed on an ongoing basis (e.g. where demand is substantially inelastic). The switching between brands of goods or service providers is referred to in the retail trade as "churning" and, while some degree of churning is unavoidable due to consumer experimentation in an effort to maximize satisfaction with the value received for goods or services purchased, any business will wish to minimize churning since churning necessarily represents either customers that are at least at risk of being lost, either permanently or for a significant period of time, or additional demand for which adequate production capacity, infrastructure and/or staffing may not exist and, if expenditures are made to increase production capacity, infrastructure and/or staffing to meet increased demand, there is no guarantee that such demand will continue.

The importance of churning to any given business generally corresponds to the net increase or decrease in demand for particular goods or services. In regard to goods, churning may be reasonably well-balanced over a geographically broad market. Automated inventory control from point of sale (POS) terminals also allows many retail establishments to assure that adequate stock is ordered and received to satisfy demand and allows some additional efficiency to be derived from so-called "just-in-time" methods of manufacture and delivery. On the other hand, due to current circumstances in regard to some services and for telecommunication providers in particular, churning is of major importance in regard to infrastructure, much of which has only been recently installed and which is being rapidly expanded. Further, current circumstances of marketing of such services (e.g. current system performance, available coverage area, operability in particular environments, features of newly available devices and the like) tends to encourage churning which appears to continue at a relatively high level. Prediction of churning and determination of customers likely to churn becomes particularly difficult in such a market environment.

SUMMARY OF THE INVENTION

It is therefore an object of the present invention to provide a methodology for prediction of churning, identification of individuals or groups likely to churn and to support marketing decisions intended to reduce churning, particularly applicable to service providers in the telecommunication marketplace which accounts for factors that could not be considered in prediction methods for churning prior to the present invention.

It is another object of the present invention to provide an improved model of a population of customers that includes social network analysis in order to provide a churn prediction methodology that is of improved accuracy and supports an improved level of confidence in the result.

It is a further object of the invention to provide prediction of churning by one or more cohorts of a person otherwise determined to be likely to churn through discovery of influence, by proxy through social network analysis and to support mitigation of such churning by both the person and the cohorts.

It is a yet further object of the invention to provide a methodology of including factors determinable through social network analysis into churn prediction modeling to increase levels of accuracy and confidence sufficient to support actions and expenditures directed to limiting churning of individuals and groups determined to be likely to churn.

In order to accomplish these and other objects of the invention, a method of predicting churning in a population is provided comprising steps of counting interactions between respective members of the population, determining chains of interactions having stages corresponding to individual members of the population, applying different weights to the number of interactions for respective stages of the chains of interactions to produce weighted numbers of interactions, and summing the weighted numbers of interactions along the chains of interactions.

In accordance with another aspect of the invention, a method of predicting churning in a population is provided comprising steps of configuring a data processor to count interactions between respective members of the population, configuring a data processor to determine chains of interactions having stages corresponding to individual members of the population, configuring a data processor to apply different weights to the number of interactions for respective stages of the chains of interactions to produce weighted numbers of interactions, and configuring a data processor to sum the weighted numbers of interactions along the chains of interactions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

As alluded to above, churn prediction over a large population presents some severe difficulties in modeling as well as in processing, particularly in regard to services. Modeling and processing are related aspects of churn prediction since many different factors may be involved in an individual decision to seek goods or, especially, services from a different provider and identification of these factors and the relative importance of these factors to an individual customer are highly speculative and varied while inclusion of multiple factors may greatly increase processing complexity and duration. Further, for some types of services such as mobile telecommunications, for which the problem of churning and the effects thereof are particularly severe (and only slightly less so for wired telecommunications services), the sources of information are few and extraction of information upon which (often somewhat arguable or speculative) inferences can be drawn is particularly difficult. It should be understood in the following discussion that while the invention will be described in accordance with application to telecommunication services and mobile telecommunication services, in particular, where problems of accurate churn prediction have proven particularly intractable, the invention is considered to be applicable to churn prediction for any commercial market, including commercial trading of goods or even commercial instruments and commodities and the meritorious effects of the invention will have a value directly corresponding to the severity of problems of accurate churn prediction and alleviation in that market.

First, the volume of data to be processed is often extremely large which requires long processing times unless the volume of data is truncated or limited in some way while such truncation or limitation may obscure or skew some aspects of the results. For mobile telecommunications, the discrete unit of transactional information is the call detail record (CDR) which will identify the caller and callee, the mobile subscriber integrated services digital network (MSISDN), the date and time the communication took place and its duration and the type of communication conducted. The amount of data corresponding to traffic on a given network over a one-month period of time can easily exceed one terabyte of storage.

In many known churn prediction models, determinations are made of a subset of customers to which processing (sometimes referred to as data mining) is to be applied and further, to reduce the subset by determining and sorting on a customer value parameter either before or after the churn prediction analysis is performed. Such techniques for reduction of data to be processed may serve to reduce processing time and costs but may produce results in which valuable and important information and possible further insights into churn prediction are obscured, for example, determining subsets based on demographics may confuse relative importance of factors underlying churning for individuals in different subsets and limiting analysis to customers determined to be more valuable may prevent detection or responsive action in regard to a large group that may churn within a short period of time but for different reasons.

Second, the motivation of an individual that may affect the likelihood of that individual to churn are many and potentially complex and certainly not limited to the exemplary availability of particular goods or services briefly alluded to above. Further, some of these motivations may not be reflected in data that can be collected consistent with privacy concerns of those individuals. For example, some known approaches to churn prediction include the taking of surveys of customers which are expensive and may be considered, by some customers, to be objectionably intrusive. In contrast, CDRs are generally deemed acceptable records for a telecommunications service provider to maintain although such records contain records of all persons that are called by a subscriber or customer.

Third, the nature of the data available for use in churn prediction may increase the difficulty of analysis in accordance with motivational factors that may affect the likelihood of churning. Information in regard to other motivational factors may simply not be available from data that can be collected consistent with customer privacy or may be extracted from available data only with extreme difficulty and/or uncertainty due to high levels or cascading of inferences. For example, in the telecommunications market, the only information generally collectable and collected is information regarding the calling party (caller) and called party (callee), the date of the call, the duration of the call and, possibly, any difficulty or malfunction detected during the call, such as a call being "dropped" rather than being terminated in the normal manner under control of one, both or all parties to the call. (It should be understood in the following discussion that the term "call" and variations thereof are intended to be collective references to all forms of communication over telecommunications infrastructure and is inclusive of voice communications, facsimile transmissions, short message service (SMS), multimedia text messaging, data services and the like, without limitation as to technology utilized or current existence or foreseeability of such modes of communications.)

Fourth, to date, churning prediction has been directed to determination of factors that may affect the likelihood of an individual to churn such as indicators of dissatisfaction with the goods or services of interest, documentation of complaints or problems with the product or service, probable needs of customers for features of the goods or services that may be affected by demographics and the like.

Due to any or all of the above complexities, churn prediction modeling has usually been limited to analysis of individual customers that may be later grouped in accordance with similarities of probable motivations for remedial action to reduce the likelihood of churning for the group such as advertising, discounts, incentives, special pricing structures and the like. Nevertheless, churn prediction has not been particularly successful, particularly in the telecommunication market where many more motivational factors than can, as a matter of practicality or even possibility, be analyzed may be of substantial or even prime importance. Further, the inventors have realized that even the marketing of mobile telecommunications tends to foster a type of competition between service providers that may tend to increase churning, particularly in regard to some potentially identifiable groups of individuals. For example, advances in technology and product design lead to frequent introduction of new mobile telecommunication handsets with attractive additional features and which may be made available to the public exclusively through a given service provider or less than all service providers. Some of these handsets may not even be compatible with some of the respective communication infrastructures of some providers. Therefore, if a new feature is developed that is desired by a given customer, the customer has no option but to churn unless, by chance, the customer is already a customer of the service provider through which the feature is available. Similarly, the infrastructure developed by respective service providers may not provide communication coverage in all locations important to a given customer. For example, some providers may provide for connectability in locations such as subways of foreign countries while others do not and the availability of such service, when it becomes available, may be a factor that motivates a group of individuals to churn.

Additionally, pricing policies of telecommunication service providers may be a factor that has a strong influence on churning. Usually, at the present time, there is a substantial premium charged for calls made between the infrastructures or networks of respective telecommunication service providers while many service providers allow unlimited calls to be made within their own network or a specified group of callees within the network without additional charge. Therefore, there is a strong incentive for an individual to use the same network as a frequently called individual. Conversely, when a frequently called individual changes from one service provider to another, there is a strong incentive for all individuals who call that individual frequently to churn. Thus, due to the nature of the marketplace for some goods and services, churning by a single individual may precipitate churning by a more or less large plurality of other individuals who may or may not have any other motivation to change service providers.

As the inventors have recognized, numerous similar factors that may affect churning may exist as an incident of relationships between customers and that failure to consider such factors in churn prediction methods that focus principally on individual behaviors and/or experiences may have been, at best, only marginally successful due to that very focus on individuals rather than on the relationships between individuals. Accordingly, the present invention provides for churn prediction based in whole or in substantial part on social network analysis and, further, provides a simplified method of social network analysis of particular applicability to telecommunications.

Figure 1A:
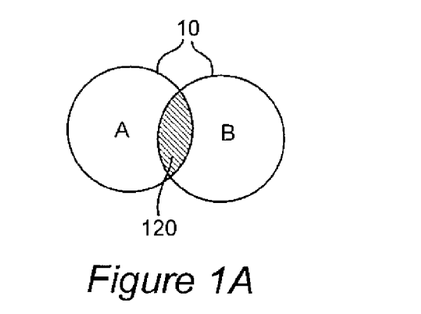
FIG. 1 is a Venn diagram that may be helpful in understanding the basic principle of operation of the invention.
Figure 1B:
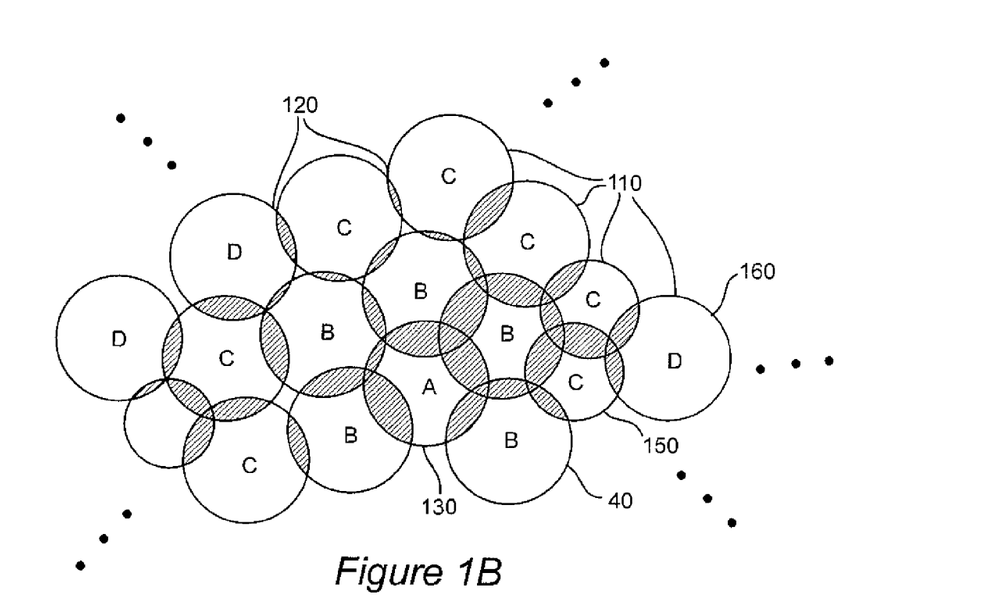

Referring now to the drawings, and more particularly to FIGS. 1A and 1B, there is shown a Venn diagram that may be of assistance in conveying an understanding of the basic principles underlying the invention in performing social network analysis in a manner in which complexity of the analysis is comparatively reduced. FIG. 1A illustrates the basic notion of intersection of sets as applied to two subscribers to a telecommunication system and FIG. 1B represents an extension of FIG. 1A to all subscribers to a given network to the degree preferred for practice of the invention. Circles 110 in FIGS. 1A and 1B indicate the group of subscribers and number of calls made by each respective individual customer of or subscriber to a service within a given infrastructure or network. FIGS. 1A and 1B are simplified to the extent of depiction in a plane whereas in a real telecommunication system, any individual can call any other individual. The individuals need not also be customers of the same infrastructure or network but, for reasons outlined above, subscribers to the same network will generally predominate. When a callee (e.g. represented by, for example, a circle B) of a given caller (e.g. represented by, for example, a circle A) also calls the caller, the circles representing respective subscribers or customers will overlap, as depicted by shaded area 120 which is variable in size or area and can be quantitatively evaluated as a measure of the relatedness of callers A and B. The size of circles 110 depict an arbitrary limit on number of calls made and/or a particular time horizon imposed to limit the amount of data to be considered (e.g. the last 100 calls made or fewer if less that 100 calls were made by a given subscriber or customer within a time horizon of, for example, one month). Limitation to a reasonable number of the most recent calls and limitation of the time horizon is considered to be unlikely to obscure results of a prediction covering a projection of churning that is likely within a short time in the future.

FIG. 1B illustrates a more extensive Venn diagram that represents a portion of the subscribers to or customers of a given service provider network or infrastructure; of which FIG. 1A can be considered to be a part. It should be noted that a principal function of the invention is to determine and quantitatively evaluate the influence any given subscriber or customer may have on other subscribers or customers so that this information can be combined with other determinations as to the likelihood that any given individual subscriber or customer will churn and thus provide a measure of the likely magnitude of churning that would result from churning by any individual subscriber or customer. Thus, being able to project the magnitude of churning that would result from churning by an individual provides a quantitative measure of the importance of seeking to prevent churning by a given individual. That importance can then be ranked and the individual subscribers or customers with the greatest influence upon churning can be identified and measures to avoid churning by such individuals can be undertaken in respect to an individual or group of individuals exhibiting similar characteristics in regard to churning (e.g. individuals who regularly churn at the expiration of a service contract).

It should also be appreciated from FIG. 1B that only one illustrated circle is labeled A, as in FIG. 1A but groups of illustrated circles 110 are labeled B, C and D, in sequence, outwardly from circle A. That is, all circles labeled B have an intersection or overlap with circle A, all circles labeled C have an intersection of overlap with at least one circle labeled B and all circles labeled D have an intersection or overlap with at least one circle labeled C. This sequence can be continued to cover the entirety of any population but can be and preferably is limited to a sequence of three intersections or relationships away from any individual. This feature of the illustration of FIG. 1B may be helpful in visualizing the methodology and underlying rationale of the present invention in its preferred form.

Specifically, computationally practical algorithms presently exist for modeling energy transfer from one incremental volume of a material to an adjacent incremental volume of material with an energy decrease from one incremental volume to all other surrounding incremental volumes, in sequence, through a sequence of thirty or more such incremental volumes. Such an algorithm can be used to model, for example, circular ripples propagating outward from a perturbation in a previously still body of water. The inventors have recognized a potential parallel of the influence between subscribers or customers sought to be modeled by the invention to the model of energy transfer which such energy propagation algorithms seek to model but which can be applied for modeling of a telecommunication system in a manner which is much less computationally intensive. There is also a theory that a maximum of six degrees of separation exist between any two individuals in a group of any size. That is, the influence of any given individual on any other individual on earth can be traced through a sequence of individuals (or items such as incremental volumes alluded to above) that does not exceed six relationships. Further, the rate of diminution of influence in each stage of the sequence of relationships has been determined by the inventors to be such that any influence becomes vanishingly small after a sequence of only three relationships which can propagate an influence from one individual to the next in a sequence. Therefore, for any individual, A, 130 there is no need to consider the influence of that individual beyond a sequence of three individuals (e.g. through an individual B 140 and an individual C 150 to individual D 160). This limitation of the extent of influence propagation to be considered substantially reduces the computational intensiveness required by the present invention to provide an analysis of data already substantially reduced in volume by considering only the calls in the CDR data which represent members of sets represented by intersections 120.

Figures 2, 4:
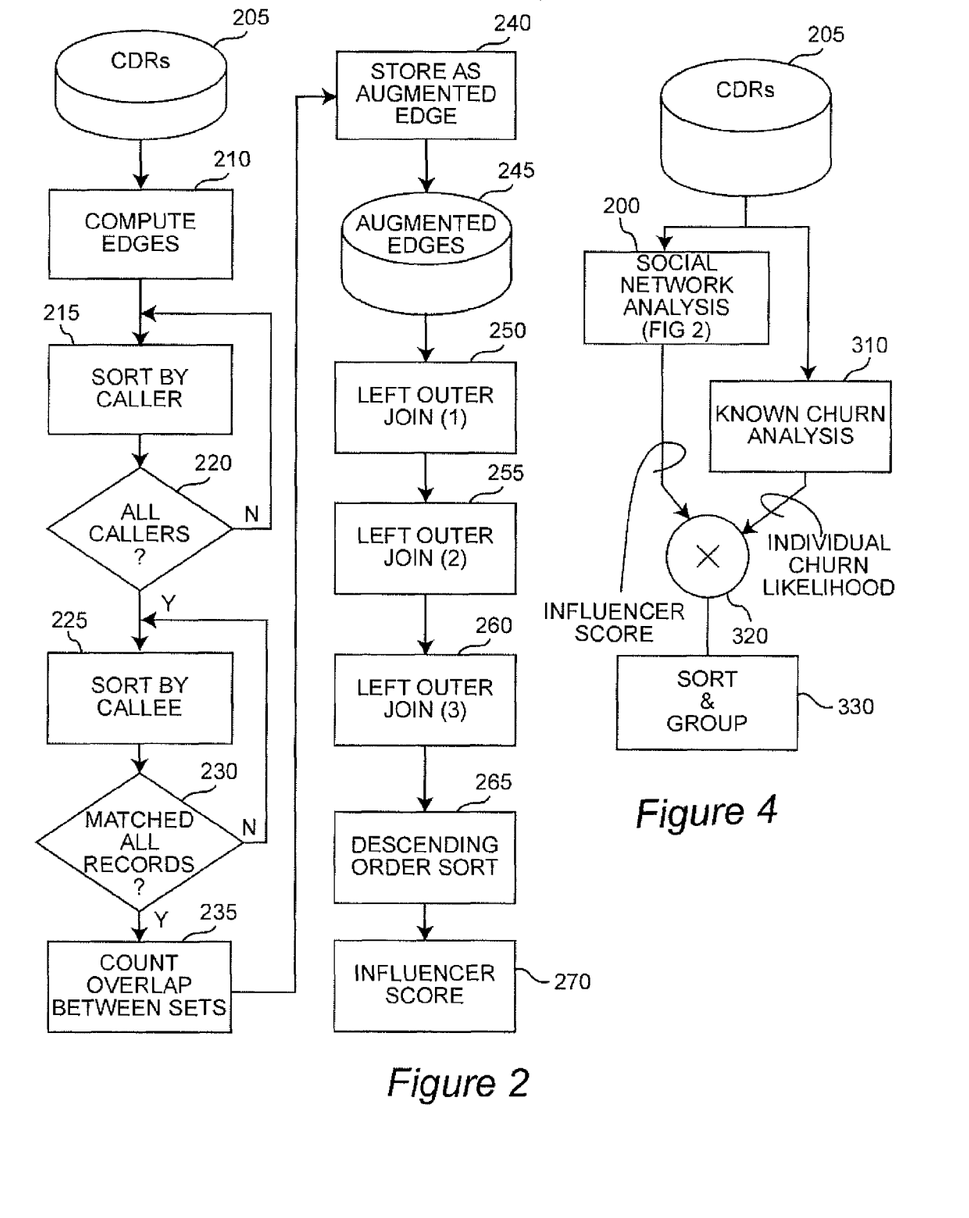
FIG. 2 is a high-level flow diagram of the methodology of the present invention.
FIG. 4 is a high level flow diagram illustrating an exemplary technique of combining the invention with a known churn prediction model to improve not only accuracy and confidence level but economies in processing, as well.

With the above understanding of the basic approach of the present invention to the problem of prediction of churning, the importance of social network analysis to such a prediction and the approach taken by the invention to social network analysis, a preferred embodiment of the method 200 in accordance with the invention will now be discussed in connection with FIG. 2. It should be understood in the following discussion that any or all of the steps depicted in FIG. 2 are preferably performed by one or more data processors that are suitably programmed to configure the data processor(s) to perform the operations which will be described below and FIG. 2 should be understood as being illustrative of such configuring of such data processor(s) as well as the performance of the operations illustrated.

The invention operates entirely on data contained within the call detail records (CDRs) which contain information that is generally considered to be the minimum information necessary for billing for telecommunication services and the maintenance of such records is generally well-accepted by the public as being non-intrusive and as respecting the privacy of subscribers/customers. This information is depicted as being contained in a database 205. However, the form of storage is irrelevant to the successful practice of the invention.

The preferred methodology in accordance with the invention begins with the computation 210 of so-called edges. (The term "edge" is derived from graph theory and is used herein in that well-accepted sense.) An edge is essentially a record of calls from one subscriber to another and is of a form which is "directed" and preferably has two weights: one being the number of calls (e.g. voice, facsimile, texts, and the like) and, optionally, the other is the total duration or other measure of message length (e.g. character count in text, etc.). Thus the computation of edges is essentially a summary of the CDRs over a population (e.g. all or a selected group) of subscribers.

The edges so calculated are then sorted twice. (It should be noted that the CDR information is generally chronological or at least contains dates and times of calls; which information is lost in the computation of edges but is unimportant to the methodology of the invention.) The first sorting 215 is by caller and is performed in a looping fashion, branching at 220 until all callers have been considered and placed in an ordered list or set. Then, the edges are again sorted, as depicted at 225 by callees which appear in the portions of the ordered list or set portion for each caller. This process develops another ordered list and, importantly, serves to remove information from consideration which cannot form part of an intersection or overlap 120 as discussed above in connection with FIGS. 1A and 1B. This further sort process is also preferably performed in a looping fashion by branching at 230 until all records have been matched. When all records have been matched the number of calls from caller A to callee B will equal the number of calls from caller B to callee A in any given intersection because the intersection area representing the number of calls between any two subscribers is quantitatively fixed. Then the size of each overlap of calls between sets corresponding to each pair of subscribers is counted, as depicted at 235, and stored as a form of data referred to as augmented edges as depicted at 240 and 245. It should be understood that an overlap for purposes of counting operation 235 is defined as:

$$\text{Overlap} = \frac{\text{\# calls from } A \text{ to } B = \text{\# calls from } B \text{ to } A}{\text{\# calls by } A}$$

This definition and count is attempting to derive a numerical measure of the similarity between the list of subscribers called by A and the list of subscribers called by B. That is, the fractional value defined as the overlap in accordance with the above equation represents the proportionality of all calls in the intersection or overlap of A and B to the number of calls made by A. This process serves to locate subscribers that have a quantifiable high degree of overlap with particular other subscribers. The degree of overlap can be subjected to a threshold (e.g. greater than 0.6 or some other fraction that can be determined from experience or training activity) to reduce the number of subscribers to whom further social network analysis will be applied and/or combined with a list of persons who have been determined by traditional churn modeling to be likely to churn for even further data reduction in a further list of subscribers who are likely to churn in response to churning by a given other subscriber. However, it should be understood that the quantitative size of the overlap between pairs of subscribers is preferably used only to develop a list of subscriber pairs where influence may be sufficiently great to have a significant bearing on whether or not churning by one subscriber will cause churning by other subscribers. The degree of influence a particular potential churner represents and the characterization of a subscriber as an "influencer" or "follower" is developed through a relational algebra methodology which will be described below in connection with FIGS. 3A-3D. That is, while the potential for influence of one subscriber on another could, in theory, be determined from the relative magnitude of overlap (considering equal numbers of calls from A to B and B to A), that methodology is not easily extended to follow chains of potential influence of each subscriber on other subscribers with whom the overlap may be small or non-existent and, in any case, where there may be no justifiable inference in regard to churning without reference to the content of messages along a chain of subscribers. Therefore, it is considered preferable to use an analysis of overlap principally to limit the data to which further social network analysis is applied and to determine likelihood of subscriber influence or being influenced based upon the combination or network of calls made by each subscriber and where influence may be propagated through a chain of subscribers even though overlaps between particular subscribers that may be included in a given chain of subscribers may or may not exist.

Referring now also to FIG. 3A-3D, three left outer joins 250, 255 and 260 are performed. Joins are, generically, operations that can be performed in relational algebra and serve to combine data in two lists into a single list that may resemble a table. A list may also be joined to itself. When numerical data is included in a list, mathematical operations can be performed on that numerical data in the course of a join. The terminology such as left/right or inner/outer and the like serve to identify the portion of one list to which parts of the other list are conformed when the join is performed and that terminology is referenced to an assumed relative position and data organization of the respective lists.

It should be noted that, as alluded to above, while any subscriber can call any other subscriber and the designations A-D for a chain of subscribers which are related to each other by calls made between them as discussed above does not necessarily apply in practice but is a useful convention here since distinct chains are being traced and information regarding chains of relationships is retained and accounted for. That is, two different chains of relationships may have some common subscribers and, importantly, some overlaps/intersections of call sets in common between them. Therefore, for purposes of this explanation, it should be understood that designations A-D, as discussed above, indicate degrees of separation between arbitrary subscribers along arbitrary chains of relationships that exist by virtue of calls that have been made. In the following discussion of join operations, the ultimate information sought to be developed is a quantitative measure of a "sphere of influence" for each subscriber. That is, based on calls made by subscribers to other subscribers, the relative degree of influence each subscriber is likely to have on other subscribers is quantitatively evaluated, as will be discussed below in regard to a simple example illustrated in FIGS. 3A-3D.

Figures 3A, 3B:
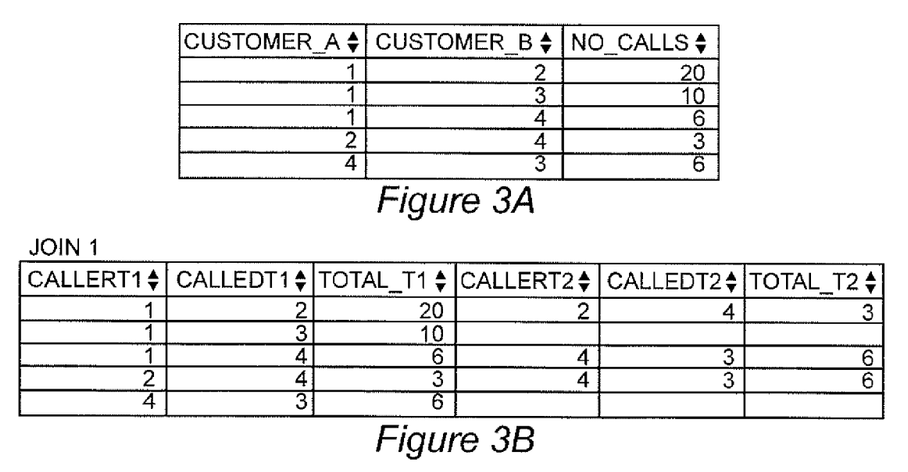
FIGS. 3A, 3B, 3C and 3D are an exemplary sequence of tables illustrating a sequence of left outer joins in accordance with the invention.

FIG. 3A illustrates an exemplary set of data derived by the process described above and extracted from memory 245. It should be noted that, in this example, individual subscribers are designated numerically and limited to four. Likewise, in this simplified example, the number of calls indicated are all the calls made during the time horizon of the analysis. All subscribers are analyzed to determine relative influence in the same operation and the designations A-D used above are not relevant and do not apply here other than allowing limitations of the number of joins to preferably be limited to three. Rather, designations of "Customer A" and "Customer B" appearing in FIG. 3A are simply programming variables for the calling customer and the called customer, respectively; the values or designations of which are given in the tables of FIGS. 3A-3D.

Thus, FIG. 3A indicates that customer 1 called customer 2 twenty times; called customer 3 ten times and called customer 4 six times. Additionally, customer 2 called customer 4 three times; customer 3 made no calls; and customer 4 called customer 3 six times. The table of FIG. 3A is referred to as outerjoin. The three joins that are preferably performed in accordance with the invention join the outerjoin table of FIG. 3A to itself three time; the last join imposing weights to assert a relaxation of influence from one subscriber to the next along a chain of subscribers.

To join FIG. 3A to itself, exemplary structured query language (SQL) query is:

```
select
  t1.customer_a as caller, t1.customer_b as called,t1.no_calls as total_t1,
  t2.customer_a as caller, t2.customer_b as called,t2.no_calls as total_t2,
    from outerjoin t1 left outer join outerjoin t2 on t1.customer_b
=t2.customer_a.
```

The above SQL query substitutes the called customer in FIG. 3A as the caller customer in the join.

The outcome of the first left outer join 250 is shown in FIG. 3B. It should be noted that the first three columns are identical to FIG. 3A. Also, the right-most three columns show a blank line following the first three columns indicating the ten calls from customer 1 to customer 3 since customer 3 made no calls. The last line of FIG. 3A appears twice in the right-most three columns of FIG. 3B since both caller 1 and caller 2 called customer 4.

The second left outer join 255 joins FIG. 3A and FIG. 3B. An exemplary SQL query to perform this second join is:

```
select
  t1.customer_a as caller, t1.customer_b as called,t1.no_calls as total_t1,
  t2.customer_a as caller, t2.customer_b as called,t2.no_calls as total_t2,
    from outerjoin t1 left outer join outerjoin t2 on t1.customer_b =
  t2.customer_a.. ),q2 as (select caller1, called
  t1,callert2,calledt2,total_t1,total_t2,customer_a as callert3, customer_b
  as calledt3, no_calls as total_t3from q1 left outer join t3 on
q1.calledt2 =
t3.customer_a
select * from q2.
```

Figure 3C:
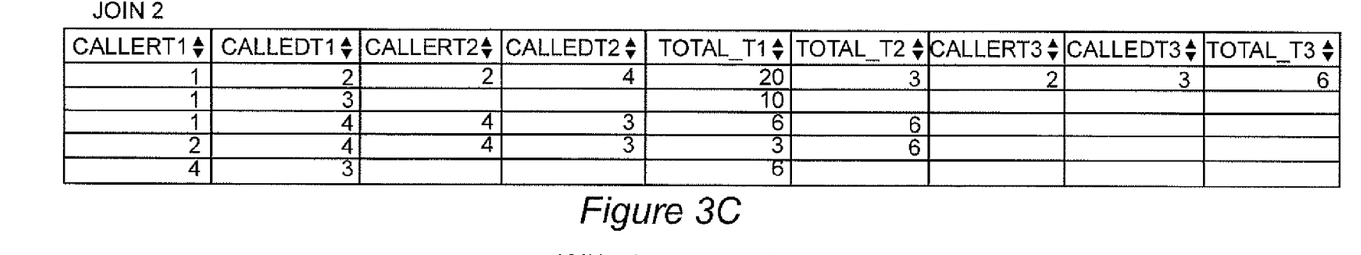

It should be noted that customers called in the first join 250 become calling customers in this second join 255. The result is illustrated in FIG. 3C in which the left-most six columns are identical in content to FIG. 3B (the Total_t1 column has been relocated) and the right-most three columns contain only a single row corresponding to the replicated row in FIG. 3B and located to follow the information of calls from caller 2 to customer 4.

The "sphere of influence" for each respective customer can now be computed by a third left outer join 260 including application of weights. An exemplary SQL query is:

```
select
  t1.customer_a as caller, t1.customer_b as
  called,t1.no_calls as total_t1,
  t2.customer_a as caller, t2.customer_b as
  called,t2.no_calls as total_t2,
    from outerjoin t1 left outer join
  outerjoin t2 on t1.customer_b = t2.customer_a.
  ),q2 as (select caller1, called
  t1,callert2,calledt2,total_t1,total_t2,customer
  _a as callert3, customer_b as calledt3,
  no_calls as total_t3 from q1 left outer join t3
  on q1.calledt2 = t3.customer_a
select
callert1,
sum(coalesce(q2.total_t1,0)*1+coalesce(q2.total
  _t2,0)80,3+coalesce (q2.total_t3.0)*0.1 as
  iweight from q2
group by callert1.
```

Figure 3D:
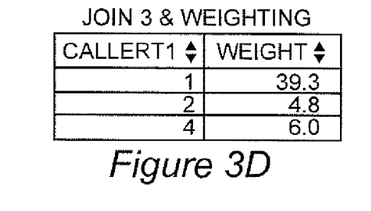

The result of this third join 260 is illustrated in FIG. 3D which provides an influence weight or influence score for each of customers 1, 2 and 4 (customer 3 made no calls). As indicated in the above SQL query, this weight or score is computed from FIG. 3C by taking the number of calls made by each caller (callers 1, 2 and 4) in column total_t1, adding the number of calls made by each caller (callers 2 and 4) in column total_t2, multiplied by 0.3 and further adding the number of calls made by each caller (caller 4) in column total_t3, multiplied by 0.1 or:

iweight$_{caller\ 1}$=36+0.3*9(=2.7)+0.6=39.3,
iWeight$_{caller\ 2}$=3+0.3*6(=1.8)=4.8, and
iweight$_{caller\ 4}$=6.0.

Thus it is seen that the modeling achieved in this process adds additional weight beyond the number of calls (or other types of interactions between members of a population) actually made by each caller (which, itself, is an indicator of influence) by adding a fractionally weighted total of the calls made by the customers called and further persons called by them and thus approximates the effects of possible social influences which are relaxed with degree of separation. While different weights can be empirically determined through comparison of the invention with actual populations of customers in a given market and their observed behaviors, the above weights appear to closely approximate churning behaviors of customers of telecommunication services that are based on social influences and appears to greatly improve the reliability of churning prediction and identification of persons likely to produce substantial churning effects in regard to telecommunication services in particular.

Returning now to FIG. 2, the methodology of the social network analysis aspect of the invention is completed by sorting the lines of list or table 270 in descending order of numerical value 260 and assigning an influence score in accordance with some logical or empirically derived rationale which will be an indicator of the amount of churning to be expected upon the churning of any given subscriber or customer. For example, the influence score assigned to respective subscribers could be a non-linear function of the weights computed in the third join 260 and illustrated in FIG. 3D or chosen to reflect a threshold that distinguishes "influencers" from "followers" as may be empirically determined.

It should be appreciated that the above simple example includes only calls made. However, as indicated in regard to computation of edges, it is preferred to also include call duration or other indicator of call length in the computation. This inclusion can be accomplished by performing the above join operations in regard to the number of call units (e.g. minutes and/or seconds) instead of calls made, augmenting the number of calls made in the above operations by quantities that reflect call duration and/or length, performing the above operations with both call numbers and call lengths, performing the above operations for call numbers, repeating the above operations for call duration or length and forming weighted sums of totals or other techniques which will be evident to those skilled in the art in view of the above examples and discussion.

Referring now to FIG. 4, the churn prediction methodology in accordance with the invention is completed by merging the results of the process 200 of FIG. 2 with the results of any known technique 310 for quantitatively assessing the likelihood of churning by any given individual subscriber/customer as discussed above, preferably by simply multiplying the respective results and sorting the resulting values in descending score order, and, optionally grouping higher scores by some additional characteristic or criteria that can be addressed by some overt action such as directed advertising, incentives, or the like.

In view of the foregoing it is seen that the invention provides a methodology for including a plausible and effective social network modeling rationale and substantially rigorous social network analysis for prediction of churning and does so in a manner which is computationally efficient and practical. The results of the methodology in accordance with the invention are of improved accuracy and particularly accommodate churn prediction for telecommunications where motivations for churning are particularly numerous and complex. The invention provides for quantitatively evaluating likelihood of churning due to influences which may exist only in the relationships between members of a given population where other reasons for churning by a given individual may or may not exist.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of predicting churning in a population, said method comprising steps of
counting interactions between respective members of said population,
determining chains of said interactions, said chains of interactions having stages corresponding to individual members of said population, said stages in a chain being limited to a predetermined number of stages,
applying different weights to said number of interactions for respective stages of said chains as determined in a limited number of relational algebra join operations corresponding to said predetermined number of stages of said interactions to produce weighted numbers of said interactions, and
summing said weighted numbers of interactions along said chains of interactions.

2. The method as recited in claim 1, wherein said predetermined number of said stages of said interactions is three.

3. The method as recited in claim 2, further including a step of determining overlaps of said interactions between members of said population.

4. The method as recited in claim 3, including a further step of
counting interactions in said overlaps.

5. The method as recited in claim 4, including a further step of
sorting said overlaps in accordance with a number of interactions counted in said step of counting interactions.

6. The method as recited in claim 5, wherein said step of determining overlaps includes steps of
sorting said interactions between members of said population in accordance with respective participants in respective interactions, and
determining a proportion of interactions of a member of said population with another member of said population to all interactions of said member of said population.

7. The method as recited in claim 6, including a further steps of
applying a threshold to said proportion of interactions, and
performing said steps of counting interactions, applying different weights and summing said weighted numbers in regard to members of said population for which said proportion of interactions exceeds said threshold.

8. The method as recited in claim 7, wherein said members of said population are subscribers to a telecommunication network and said interactions are calls made using said telecommunication network.

9. The method as recited in claim 8, wherein said telecommunication network is a wireless communication network.

10. The method as recited in claim 3, wherein said step of determining overlaps includes steps of
sorting said interactions between members of said population in accordance with respective participants in respective interactions, and
determining a proportion of interactions of a member of said population with another member of said population to all interactions of said member of said population.

11. The method as recited in claim 10, including a further steps of
applying a threshold to said proportion of interactions, and
performing said steps of counting interactions, applying different weights and summing said weighted numbers in regard to members of said population for which said proportion of interactions exceeds said threshold.

12. The method as recited in claim 11, wherein said members of said population are subscribers to a telecommunication network and said interactions are calls made using said telecommunication network.

13. The method as recited in claim 12, wherein said telecommunication network is a wireless communication network.

14. The method as recited in claim 1, further including a step of determining overlaps of said interactions between members of said population.

15. The method as recited in claim 14, including a further step of
counting interactions in a said overlaps.

16. The method as recited in claim 15, including a further step of
sorting said overlaps in accordance with a number of interactions counted in said step of counting interactions.

17. The method as recited in claim 16, wherein said step of determining overlaps includes steps of
sorting said interactions between members of said population in accordance with respective participants in respective interactions, and
determining a proportion of interactions of a member of said population with another member of said population to all interactions of said member of said population.

18. The method as recited in claim 17, including further steps of
applying a threshold to said proportion of interactions, and
performing said steps of counting interactions, applying different weights and summing said weighted numbers in regard to members of said population for which said proportion of interactions exceeds said threshold.

19. A method of predicting churning in a population, said method comprising steps of
configuring a data processor to count interactions between respective members of said population,
configuring a data processor to determine chains of said interactions, said chains of interactions having stages corresponding to individual members of said population, said stages in a chain being limited to a predetermined number of stages,
configuring a data processor to apply different weights to said number of interactions for respective stages of said chains as determined in a limited number of relational algebra join operations corresponding to said predetermined number of stages of said interactions to produce weighted numbers of said interactions, and
configuring a data processor to sum said weighted numbers of interactions along said chains of interactions.

20. The method as recited in claim 19, wherein said predetermined number of said stages of said interactions is three.

* * * * *